E. WILLIAMSON.
VEHICLE TIRE.
APPLICATION FILED JAN. 23, 1912.
1,060,301.
Patented Apr. 29, 1913.
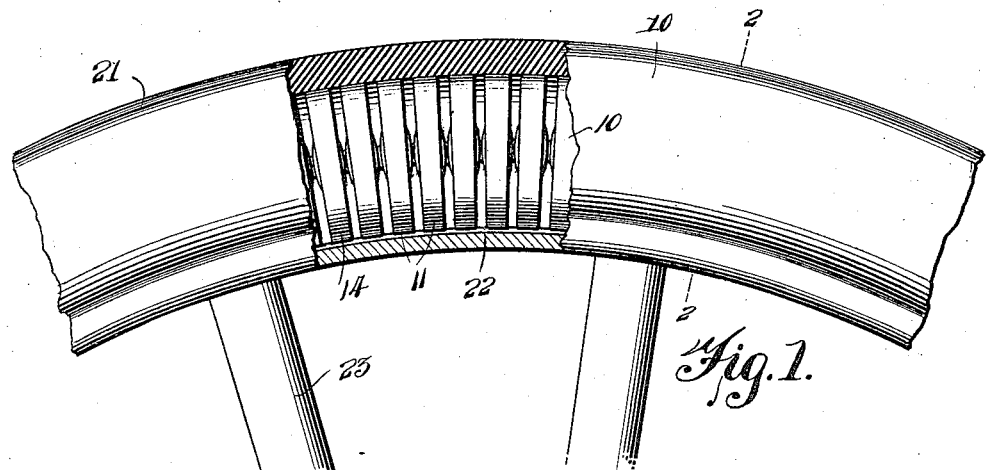
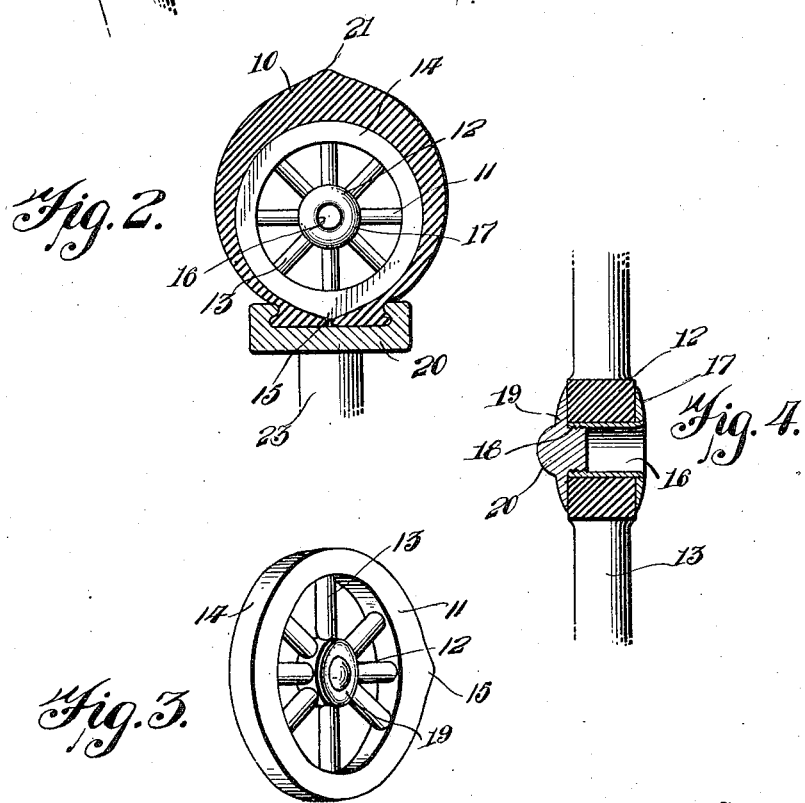
Witnesses
Carroll Bailey
P. A. Hoster
Inventor
Edward Williamson,
By Victor J. Evans
Attorney

UNITED STATES PATENT OFFICE.

EDWARD WILLIAMSON, OF CHICAGO, ILLINOIS.

VEHICLE-TIRE.

1,060,301.

Specification of Letters Patent. Patented Apr. 29, 1913.

Application filed January 23, 1912. Serial No. 672,850.

*To all whom it may concern:*

Be it known that I, EDWARD WILLIAMSON, a citizen of the United States, residing at Chicago, in the county of Cook and State of Illinois, have invented new and useful Improvements in Vehicle-Tires, of which the following is a specification.

An object of the invention is to provide a tire for use on vehicle wheels and the like.

My invention embodies among other features, the provision of a tire which need not be inflated and which at the same time embodies a resiliency and cushioning effect equal to the usual inflated tires now generally used. To accomplish the desired result, use is made of a series of adjacently mounted core members for arrangement within the shoe of the tire, adjacent core members mounted to engage so that one of the core members can move upon the other, the said core members being of a flexible nature to provide a cushioning effect.

In the further disclosure of the invention, reference is to be had to the accompanying drawings constituting a part of this specification, in which similar characters of reference denote corresponding parts in all the views, and in which—

Figure 1 is a fragmentary side elevation of a vehicle wheel showing my tire mounted thereon, parts being broken away to disclose the underlying structure. Fig. 2 is a transverse sectional view taken on the line 2—2 in Fig. 1. Fig. 3 is a perspective view of one of the rib members, showing the tire section formed therewith. Fig. 4 is a fragmentary enlarged vertical transverse sectional view of a hub.

Referring more particularly to the views, I provide a tire 10 and adjacently mounted therein are a series of core members 11, each consisting of a hub 12 having radially extending ribs 13 projecting therefrom and formed integrally therewith, a rim section 14 being formed on the outer termini of the ribs 13, the said rim sections being preferably circular in shape and each having a portion 15 thereof enlarged as shown in Fig. 2.

Extending through the tubular portion of the hub 12 is a sleeve 16 having an end thereof extended beyond one side of the hub 12 to receive a bearing plate 17, the said end of the sleeve 16 being then bent or swaged to retain the bearing plate 17 in rigid engagement with one side of the hub 12 and also form a bearing surface for the next adjacent core member 11. The other end of the sleeve 16 is provided with threads 18 on the inner periphery thereof and a button plate 19 is threadedly mounted on the sleeve 16, the said button plate being provided with an integral button 20 as shown in Fig. 4, with the inner side of the button plate in rigid engagement with the other side of the collar 12. The bearing plate 17 and button plate 19 are preferably made of a fibrous material, preferably an indurated fiber and have the outer surfaces thereof smooth and glossy to present suitable bearing surfaces.

The tire 10 includes the usual shoe 21, mounted upon a rim 22 having spokes 23 connected thereto and the tire members 11 are mounted within the shoe 21 as shown in Fig. 1, with the button 20 of one button plate 19 received within the sleeve 16 so that the button plate 19 will operate over the surface of the bearing plate 17 of the next adjacent core member. In this manner the tire members are mounted within the shoe to extend completely around the wheel and by having the enlarged portion 15 of each tire member adjacent the ends of the shoe 21, the mentioned enlarged portions form seats for the core members. Therefore, when a pressure is exerted upon the shoe 21 the compressibility of the ribs 13 and the flexibility of the rim sections 14 will produce a resiliency and cushioning effect while the enlarged portions 15, acting as seats for the tire members will also cause the clenchers or ends of the shoe to more securely grip the rim of the vehicle wheel. The enlarged portions 15 of the rim members also prevent an individual or mutual rotation of the core members as the mentioned enlarged portions extend downwardly into the slight space between the ends of the shoe.

I claim:—

1. In a tire the combination with a shoe, of core members encircled by the shoe, each of the said core members consisting of a hub, ribs extending radially therefrom, an annular rim section integrally formed on the ends of the said ribs and provided with an enlarged portion, forming a seat, a sleeve mounted to extend through the said hub, a bearing plate rigidly secured to one end of the said sleeve, a button plate threadedly connected to the other end of the said sleeve and a button integrally formed with the said plate.

2. In a tire the combination with a shoe, of core members encircled by the shoe, each of the said core members consisting of a hub, ribs extending radially therefrom, an annular rim section integrally formed on the ends of the said ribs and provided with an enlarged portion, forming a seat, a sleeve mounted to extend through the said hub, an indurated fiber plate rigidly secured to one end of the said sleeve, an indurated fiber plate threadedly connected to the other end of the said sleeve and a button integrally formed with the last mentioned plate.

In testimony whereof I affix my signature in presence of two witnesses.

EDWARD WILLIAMSON.

Witnesses:
 THOMAS DOLAN,
 ADAM C. GRAY.

Copies of this patent may be obtained for five cents each, by addressing the "Commissioner of Patents, Washington, D. C."